(12) United States Patent
Hsu (10) Patent No.: US 8,379,159 B2
(45) Date of Patent: Feb. 19, 2013

(54) METHOD AND APPARATUS FOR IMPROVED RETARDER OF 3D GLASSES

(76) Inventor: Roger Wen-Yi Hsu, Rancho Cucamonga, CA (US)

( * ) Notice: Subject to any disclaimer, the term of this patent is extended or adjusted under 35 U.S.C. 154(b) by 0 days.

(21) Appl. No.: 12/842,730

(22) Filed: Jul. 23, 2010

(65) Prior Publication Data

US 2011/0221993 A1 Sep. 15, 2011

Related U.S. Application Data

(60) Provisional application No. 61/313,598, filed on Mar. 12, 2010, provisional application No. 61/324,237, filed on Apr. 14, 2010, provisional application No. 61/327,410, filed on Apr. 23, 2010, provisional application No. 61/334,856, filed on May 14, 2010.

(51) Int. Cl.
G02F 1/1335 (2006.01)
(52) U.S. Cl. .......................... 349/15; 349/117
(58) Field of Classification Search .................. 349/13, 349/15, 117
See application file for complete search history.

(56) References Cited

U.S. PATENT DOCUMENTS

| | | | |
|---|---|---|---|
| 4,111,695 A | 9/1978 | Yevick | |
| 4,160,799 A | 7/1979 | Locey | |
| 4,238,443 A | 12/1980 | Levy | |
| 4,508,526 A | 4/1985 | Dutcher | |
| 4,608,105 A | 8/1986 | Alger | |
| 5,061,042 A | 10/1991 | Nakamura | |
| 5,113,285 A | 5/1992 | Franklin | |
| 5,245,456 A | 9/1993 | Yoshimi | |
| 5,285,303 A | 2/1994 | Okada | |
| 5,355,183 A | 10/1994 | Andrea | |
| 5,366,682 A | 11/1994 | Morikawa | |
| 5,472,538 A | 12/1995 | Minakuchi | |
| 5,821,989 A | 10/1998 | Lazzaro | |
| 5,888,634 A | 3/1999 | Shimizu | |
| 5,999,240 A | 12/1999 | Sharp | |
| 6,002,518 A | 12/1999 | Faris | |
| 6,219,121 B1 | 4/2001 | Sahouani | |
| 6,330,108 B1 | 12/2001 | Nishikouji | |
| 6,359,664 B1 * | 3/2002 | Faris ............................... | 349/15 |
| 6,498,679 B2 | 12/2002 | Lee | |
| 6,542,300 B2 | 4/2003 | Umemoto | |
| 6,613,243 B2 | 9/2003 | Ricks | |
| 6,751,023 B2 | 6/2004 | Umemoto | |
| 6,771,340 B1 | 8/2004 | Yoshimi | |
| 6,786,599 B2 | 9/2004 | Hayashi | |
| 6,807,006 B2 | 10/2004 | Nakagoshi | |
| 6,819,431 B2 | 11/2004 | Carlson | |
| 7,099,083 B2 | 8/2006 | Johnson | |
| 7,105,586 B2 | 9/2006 | Verrall | |
| 7,106,509 B2 | 9/2006 | Sharp | |
| 7,169,447 B2 | 1/2007 | Su Yu | |
| RE39,605 E | 5/2007 | Verrall | |
| 7,221,510 B2 | 5/2007 | Mizushima | |
| 7,251,075 B2 | 7/2007 | Trapani | |
| 7,320,515 B2 | 1/2008 | Lin | |
| 7,339,736 B2 | 3/2008 | Trapani | |
| 7,354,632 B2 | 4/2008 | Murakami | |
| 7,381,507 B2 | 6/2008 | Kwok | |

(Continued)

*Primary Examiner* — Phu Vu
(74) *Attorney, Agent, or Firm* — Alexander Chen, Esq (57) ABSTRACT

A process of creating a retarder using thin-stretched polymer film to perfectly conform to a curved mold and achieving nearly-crystallized lamination thanks to minimized thickness of said retarder using PVA film; thus, achieving greatly-enhanced optical clarity, contrast, and 3-D effect during stereoscopic image viewing and greatly-reduced user discomfort. A 3-D stereoscopic viewing lens having a retarder film using a PVA film filled with a gap filling agent to create a refringent effect, a polarized film and a base material.

4 Claims, 8 Drawing Sheets

U.S. PATENT DOCUMENTS

| | | |
|---|---|---|
| 7,473,446 B2 | 1/2009 | Ito |
| 7,515,231 B2 | 4/2009 | Hale |
| 7,517,081 B2 | 4/2009 | Lipton |
| 7,524,053 B2 | 4/2009 | Lipton |
| 7,528,906 B2 | 5/2009 | Robinson |
| 7,662,456 B2 | 2/2010 | Bell |
| 7,695,653 B2 | 4/2010 | Hsu |
| 2006/0285026 A1 | 12/2006 | Robinson |
| 2008/0062259 A1 | 3/2008 | Lipton |
| 2008/0129899 A1* | 6/2008 | Sharp .............. 349/13 |
| 2008/0278807 A1 | 11/2008 | Richards |
| 2009/0092771 A1 | 4/2009 | Sasata |
| 2009/0097117 A1 | 4/2009 | Coleman |
| 2009/0174940 A1 | 7/2009 | Johnson |

* cited by examiner

METHOD AND APPARATUS FOR IMPROVED RETARDER OF 3D GLASSES

CROSS REFERENCE TO RELATED APPLICATIONS

This application claims the benefit of U.S. provisional application Ser. No. 61/313,598 filed on Mar. 12, 2010, U.S. provisional application Ser. No. 61/324,237 filed on Apr. 14, 2010, U.S. provisional application Ser. No. 61/327,410 filed on Apr. 23, 2010, U.S. provisional application Ser. No. 61/334,856 filed on May 14, 2010, the disclosures of which are incorporated herein by reference.

FIELD OF THE INVENTION

The present invention entails a novel process of forming a lens for improved 3-D perception of stereoscopic motion pictures, whereby the retarder film is formed in a continuous stretch process to the lens shape while making the lens to prevent distortion and defects. The novel method allows for thinner stretching of PVA and polymer to perfect the shape and curve match between the lens and the user's eyes, for the retarder optical device to be laminated to the linear or circular polarizer without need for an extra polymer sheet, thereby improving light transmission for 3-D stereoscopic viewing, and for production of various specific thicknesses of the retarder film to enhance viewing contrast.

BACKGROUND OF THE INVENTION

Stereoscopy, or three dimensional imaging, relates to any technique that records three dimensional visual information and creates an illusion of enhanced depth in a user's perceived image. Traditional two dimensional images utilize human visual cues of occlusion of one object by another, convergence of parallel edges, change in size of textured patterns, haze, desaturation, shift to bluishness, and subtended visual angle. Stereoscopy enhances the illusion of depth in motion pictures, photographs, and other two dimensional images by presenting slightly different images to each eye, and thereby adding the human visual cue of stereopsis.

Glasses for viewing three dimensional images exist in two categories: active and passive. Among active 3-D glasses are liquid crystal shutter glasses and display glasses. Liquid crystal shutter glasses contain liquid crystal that blocks or passes light through synchronization with images on a computer display, using alternate frame sequencing. Stereoscopic head-mounted displays include one display per eye, which display a different perspective near each eye, and are not used in conjunction with an external screen to be viewed at distance. Some examples of active shutter glasses lens are controlled by infrared (IR), radio frequency (RF), DLP-LINK®, BLUETOOTH® TRANSMITTER and sent-timing signal which uses electronic component to receive signal from emitter connected to display to activate a light shutter with the frequency of 120 Hertz or 240 Hertz or more.

The active shutter glass lens needs to be in a dark room in order to realize better resolution and full stereoscopic sensation. Some people like this but some will feel uncomfortable as well as their eyes and brain will get tired in a longer period time over than 2 hours. Moreover, active shutter glass lens has high resolution but the flat shape of frame and heavier than usual weight, increase eye strain, eye pressure, and induce nausea and headache when wore over long periods of time. Using flat lens shape, such lenses do not match the natural curvature of the eye. Due to the flashing of stereoscopic images at 120 Hertz or more, it will cause greater eye discomfort without a lens curvature. This invention aims to create a lens curvature or cylinder for 3D glasses.

On the other hand, passive 3-D glasses include linearly-polarized glasses, circularly-polarized glasses, infitec glasses, complementary color analyphs, chromadepth method glasses, anachrome compatible color analyph glasses, and red-eye shutter glasses. Linearly polarized glasses are used when a stereoscopic motion picture is projected and superimposed on the same screen through orthogonal polarizing filters. The viewer wears glasses containing orthogonal polarizing filters, which only pass through similarly polarized light and block orthogonally polarized light, allowing the viewer to only see one of the images in each eye to achieve a 3-D effect. Viewers must keep their heads level in order to prevent bleeding of images from the left and right channels into the opposite channel.

A more advantageous passive 3-D method is the circularly polarized glasses which are used in circumstances where two images are projected superimposed onto a screen through circular polarizing filters of opposite handedness. The user wears eyeglasses which contain a pair of circular polarizing filters mounted in reverse, whereby light that is left-circularly polarized is extinguished by the right-handed analyzer and light that is right-circularly polarized is extinguished by the left-handed analyzer. This allows the user to tilt his head while viewing stereoscopic images and still maintain left and right separation.

Circularly polarized glasses have the advantage over linear polarized glasses because viewers with circularly polarized glasses may tilt their heads and look about without a disturbing loss of 3-D perception, whereas viewers using linear polarized glasses must keep their heads aligned within a narrow range of tilt for effective 3-D perception, or risk seeing double or darkened images. Currently circularly polarized glasses use flat lens that cannot match with the eyeball curvature. As a result, vision will not be optimal and eyes get tired easily. A further drawback of flat laminated lens is that after it is cut and curved to a specific shape with a certain eyeball curvature, the molecules would be rearranged in films again which further distorting the clarity. Therefore it is important to create a curvature of the lens without rearranging the molecules.

The current construction of flat lens for passive linear polarized glasses, passive circularly polarized glasses and active shutter glass lenses limits the frame shape and design, which contribute to heavy discomfort in the user's eyes and brain. Generally, polarized 3-D lenses require a polymer laminate to support the retarder film on the lens. A retarder is an optical device that alters the polarization state of a light wave traveling through it. Currently, materials used to fabricate retarder are by using flat sheet of PC (polycarbonate). The problem with flat sheet PC (Polycarbonate) is that it does not curve well, thus unable to conform to lens having curvature. By implanting the method of using PVA material to fabricate retarder of the present invention, it now becomes possible to make any retarder tailoring to curvature which has the consistent circulation variation. The new method of processing the retarder with new laminate technology improves the 3-D stereoscopic image. The linear polarized film or partially circular polarized film is glued to the retarder. The retarder is filled with gaping agent. The epoxy liquid is laminated outside the retarder then cured with air or UV light to create a 3-D circular polarized function card. The new function card will have a better birefrigent effect without extra polymer sheets, thus improving transmission. Currently state of the art allows for 60-85% transmission. Other inventions use polymer sheets to support the linear polarizer. The use of polymer sheet requires moist glue, which interferes with transmission. In our invention, the thinness of the PVA retarder film allows the application of almost crystallized lamination possible.

The present invention involves a process by which a thin PVA retarder and a circular polarizer may be produced and assembled with dry glue. This process allows the wearer to view stereoscopic images for a longer time period without discomfort. The process entails application of organic polyvinyl alcohol (PVA) as the ingredient to create retarder film which is a substantial improvement to current flat 3-D lenses. Other advantages of these methods versus previous methods include making distortion-free, thinner, flexible, functional, comparable, durable, optimal-performance circular polarized 3D lens. This innovative method allows for conforming the retarder film onto a lens shape when the retarder film is still malleable and moist rather than cutting the lens from a flat sheet of polymer.

OBJECT OF THE INVENTION

Objectives of the present invention include production of high quality retarder film and application of said film to passive circularly polarized 3-D lenses in order to create aesthetically pleasing and highly comfortable eyewear to view stereoscopic images in accurate and brilliant color and full resolution.

Another objective of this invention is to produce distortion-free, thinner, more flexible and durable, and visually-optimized circularly-polarized 3-D lenses through the novel process of forming curved lens surfaces during the malleable or moist lens production phase, as opposed to cutting the lens from a flat polymer sheet, which causes optical distortion and end user discomfort.

SUMMARY OF THE INVENTION

The invention has been devised in view of the circumstances and it is the object of the invention, among others, to produce aesthetically-pleasing, optically-accurate, and highly comfortable 3-D lenses and glasses using high quality retarder film applied to circularly-polarized lenses in a novel process which curves the lens surface during the malleable or moist lens production phase.

This novel process is highly advantageous because forming the lens shape while creating the retarder film prevents physical defects and distortion caused by a two-step retarder film production process. Furthermore, this novel process allows for thinner stretching of PVA using a wetting process through specific temperature, moisture, and dimensional control of the polymer, enabling a perfect conformation of the polymer to the mold. The physical form of the retarder can be perfectly shaped using this process. The new invention can apply to 3-D glasses, advertisement panels, taillights, lamps, and especially applications with curved shapes.

A gap-filling agent is added to the water tank in the process to fill almost all molecular gaps in PVA film to create a bi-refrigent film, flat, or multi-shaped retarder.

The curved lens has a better 3D effect than a flat lens. However, the new invention can also improve the effect of flat lens because the molecules of PVA are arranged in order. Although the curved lens is better than flat lens, the flat lens in the present invention, after stretching along the x-axis, fixing on the adjustable clamping holder to continue the stretch along y-axis and making sure that the molecules are arranged in order, allows for the new retarder to be thinner and more flexible. The new retarder uses liquid glue to laminate the linear polarizer or partial polarizer to achieve optimal nearly-fully-dried quality. Our flat lens has one or two fewer layers of polymer on the linear polarized of two sides, which creates a better 3D effect.

Additionally, this novel process may be applied to flat lenses because the polymer molecules are arranged in order and simply require stretching along the x-axis and affixation of a clip holder to stretch along the y-axis to enhance the lens 3-D effect.

This novel process enables production of a retarder, which is an optical device that alters the polarization state of a light wave traveling through it, with new laminate technology to improve the 3-D stereoscopic image. The linear polarizer or circular polarizer is laminated to the retarder using epoxy liquid or polyurethane liquid, then cured with air or UV light, thus creating a Circular Polarized Function Card. No extra polymer sheet is required because this function card inherently increases light transmission. Moreover, this novel process allows for combination of a very thin retarder and PVA sheet using nearly-crystallized lamination. The current market process requires the use of a supporting polymer sheet combined with a linear polarizer using moist glue, which interferes with light transmission. The retarder film of ¼, ½, ¾ or full lambda can be used for 3-D applications. If the thickness of ¼^ were doubled, then it becomes ½^. If the thickness of ½^ were doubled, then it becomes full lambda. Different film materials will lead to different results. In general, the thickness of ¼^ is approximately 0.03-0.127 mm and depends upon the selection of different film materials. ¼ lambda or lower or the combination of ½^ and ¼^ will be used to create a 3D stereoscopic image. ½ lambdas may be used for laser protection, and ¾ and full lambda may be used for contrast. ½^ can be etched point-to-point in half to become ¼^ lambda. The sequence of ½^ and ¼ lambda will thus create a retarder for 3-D displays. The full lambda can be etched point-to-point into ½ lambda to reduce the thickness of the film. The sequence of ½^ and full lambda will create a retarder for 3-D displays. The retarder films could be flat or have certain curvatures. The retarder can be included in the lens. Generally, the full lambda reflection index equals 560 nm, ½ lambda=280 nm, and ¼ lambda=140 nm.

The present invention can reduce either the retarder or linear polarized or partially circular polarized film material by a half size due to the use of individual mold units that can rotate to different angles.

In summary, this novel process allows production of curved-surface 3-D lenses which match the curvature of the user's eyeball, thus reducing eye and brain strain. The process allows for production of curved or flat retarder film, which is produced and combined with a PVA sheet in a single process, thereby enhancing the 3-D optical effect and light transmission quality by at least 10-15%.

DETAILED DESCRIPTION OF THE EMBODIMENTS

Figure 1:
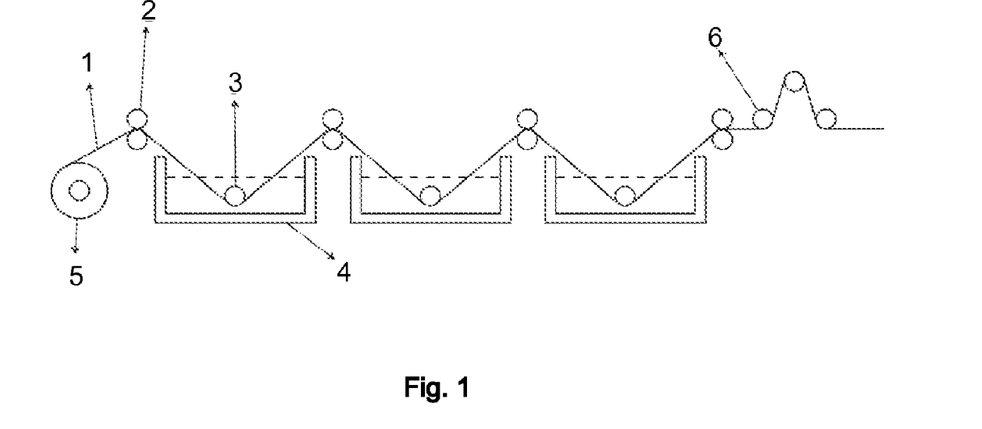
FIG. 1 depicts stretching of the retarder.

FIG. 1 depicts one embodiment of an assembly line to prepare the retarder film, wherein the process of continuous stretch of the retarder along the X-axis in a side view is shown. Rollers 2 are used to stretch and transport PVA film 1 from one or more stages. First, an untreated roll of PVA film 5 is mounted at the beginning of the assembly line. Then, water is used to wet, clean, and wash the film until the film reaches a saturation level of 70% to 85%. The film is then softened, expanded, and stretched. The film 1 is fed through a series of rollers 2 which are positioned at alternating low and high heights (see also 3, 6) throughout several basins 4 whereby the film 1 is stretched continuously along the X-axis. The retarder film is stretched to approximately three to six times its original size along the x-axis and its width is reduced to about half of its original width. The thickness of the film is also reduced to 0.03-0.12 millimeters. Through this stretching and treatment process, the molecules in the film become more evenly aligned for effective use as one of the layers in a 3-D stereoscopic lens.

During the stretching process, a gap-filling agent made of a mixture of potassium iodide, sodium iodide, copper (I) iodide, boric acid, and sodium tetraborate decahedra is added to the processing water tank 4 to form an improved retarder film. The addition of this gap-filling agent serves the purpose of filling molecular pores on the film surface to create a refringent effect.

Figure 2:
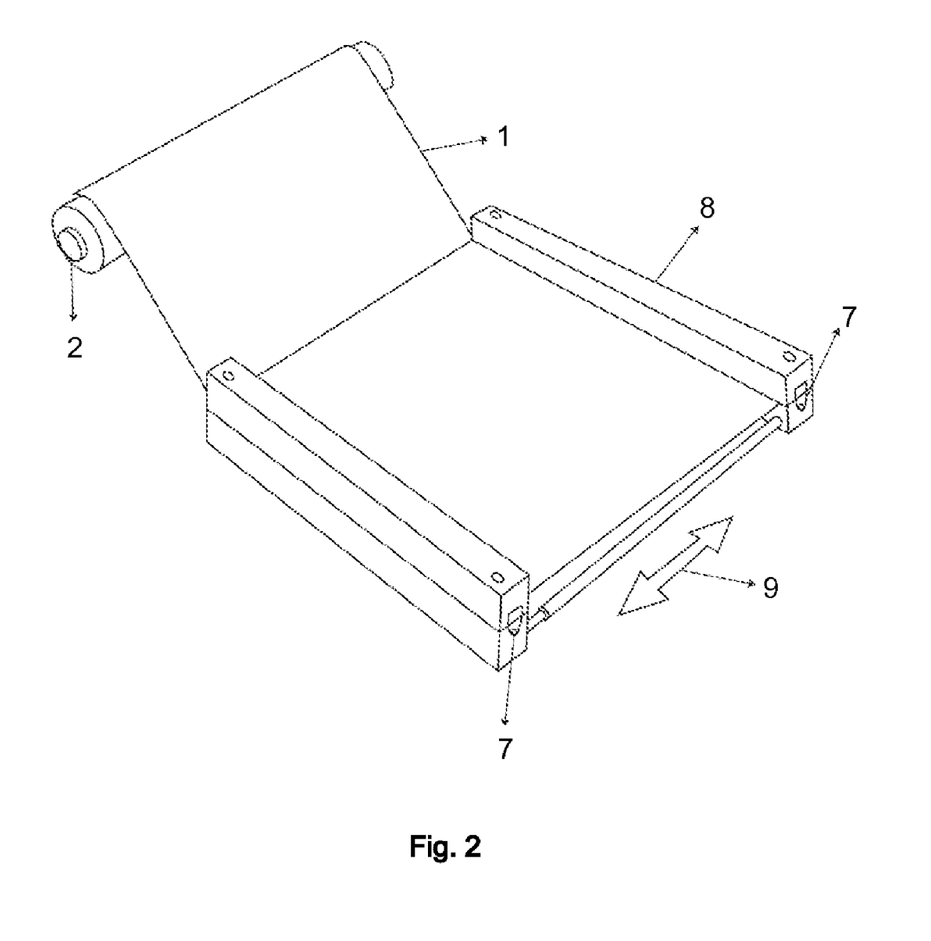
FIG. 2 depicts an embodiment of the holding frame.

FIG. 2 depicts one embodiment of a manual, semi-automatic, or automatic width-adjustable holding frame 8 to hold the X-axis top and bottom, depicted from an isometric view. The retarder film 1 is maintained at proper temperature and moisture level during the processing phase. It is stabilized between the lower frame plate and the upper frame plate, which are held together by a frame hinge 7 and clip. Additional clips may be used to prevent the retarder film from shrinking during the shaping process.

The film 1 moves over the roller 2 into a width-adjustable holding frame 8, wherein the clip side is labeled. 9 refers to the directions of adjustable width of the holding frame.

Figure 3:
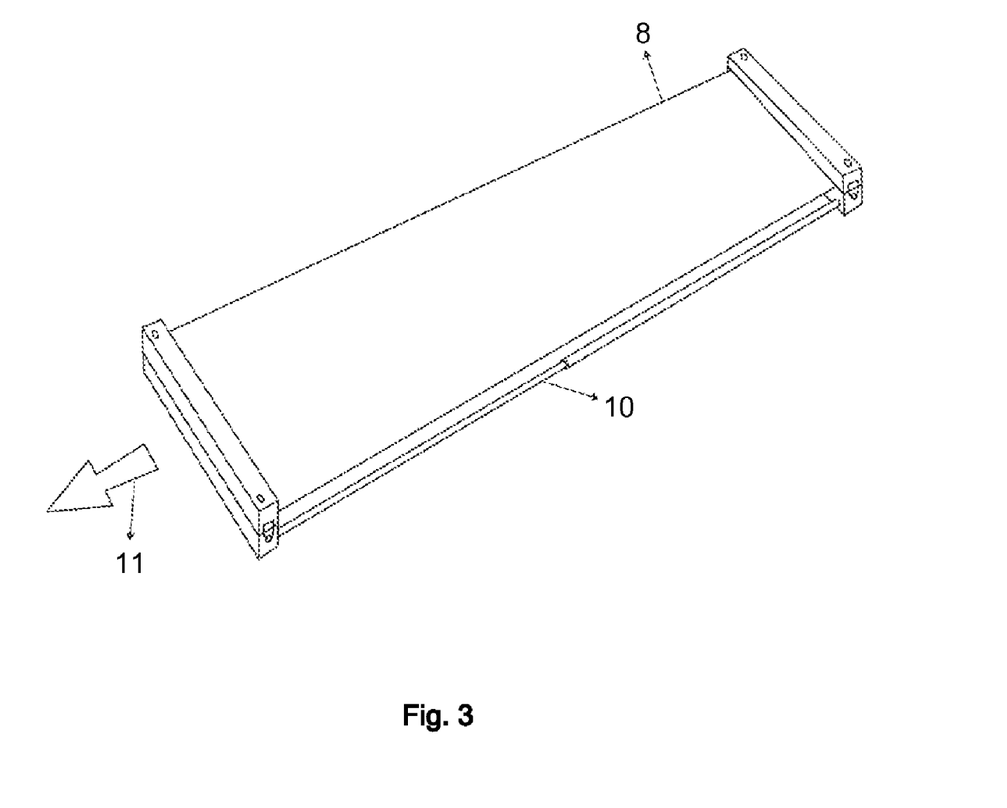
FIG. 3 depicts an embodiment of an adjustable holding frame.

FIG. 3 depicts one embodiment of an adjustable holding frame stretched along the Y-axis to a preset lockable position, as viewed from an isometric angle. The holding frame 8 contains a slide guider with an adjustable lock 10, which is adjustable along the Y-axis by sliding from one side or both sides away from the center 11.

Figure 4:
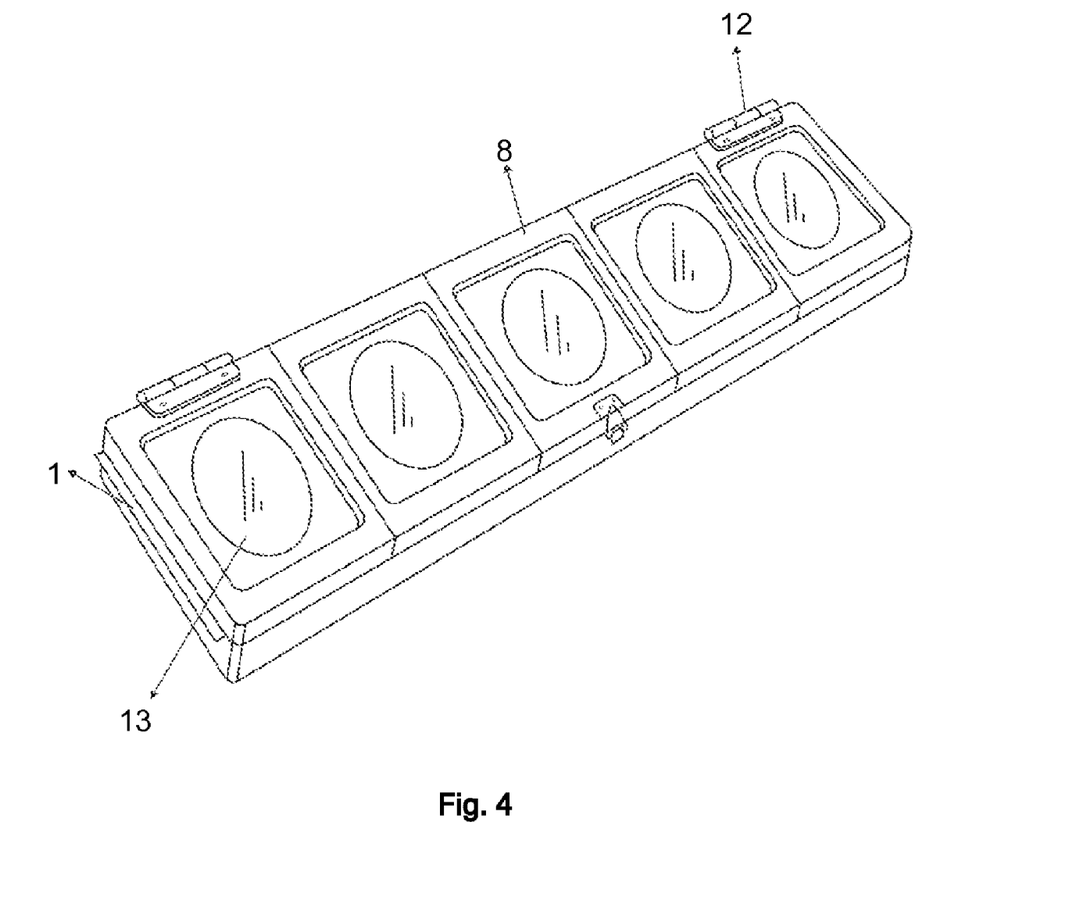
FIG. 4 depicts an embodiment of a pre-stretched retarder.

FIG. 4 depicts one embodiment of retarder film in the holding frame, which can be inserted into a curved, flat or other shaped mold. This process may be used to stabilize and cut the retarder film onto multiple holding frames. The holding frame 8 opens via hinges along the back surface 12 and allows for insertion of pre-stretched retarder film 1. Curved, flat, or other shaped molds 13 may be introduced to the holding frame 8 in order to custom mold the film 1. The convex mold is pressed onto retarder film to force the film into the desired curved shape. The retarder film is heated at 60 to 80 degrees Celsius until its moisture content is about 50%. The user then inspects and marks the molecule alignment direction of the retarder film. The film is then dried at approximately 25 degree Celsius and 40% to 50% humidity until its moisture content is above 40%.

Retarder film is cut from the end of a clean, soft retarder film output from an assembly line into the approximate size of a lens or larger. The holding frame is open in the center, which allows the convex mold to be pushed through the holding frame and against the retarder film.

One side of the convex mold is used to shape the retarder film. The convex surface of the convex mold is pushed into the flat piece of the soft film to bend it into the desired shape, curve, or arc. Since PVA retarder film is soft and wet, it will conform to the shape of the mold. In one embodiment, the convex mold is made of glass, such as glass commonly formed in thermosetting resin ophthalmic lenses, or another relatively transparent or semi-transparent polymer, so that the epoxy can be cured by UV light passing through the mold. In other embodiments, the convex mold is made of a heat-conducting material so that heat may pass through the mold. The retarder film is heated at 80 degrees Celsius or lower in order to remove moisture without melting the film. This process proceeds for ten minutes. The retarder film is wet due to the moisture content which makes it soft, and becomes dry when the reduction in moisture fixes or locks it into a specific shape. Temperatures above 80 degrees Celsius may melt or liquefy the film.

The retarder film is inspected for the presence of bubbles, dirt, color uniformity, and tearing during a quality control stage after the initial drying process. The diopter and other optical qualities of the film may be measured during this stage. If approved, the film is marked with a molecule direction. Then, the film is removed to a clean room at room temperature and low humidity level for further cooling. This results in a curved, dry retarder film that adheres better to epoxy, which later becomes retarder film in the final lens product.

Figure 5:
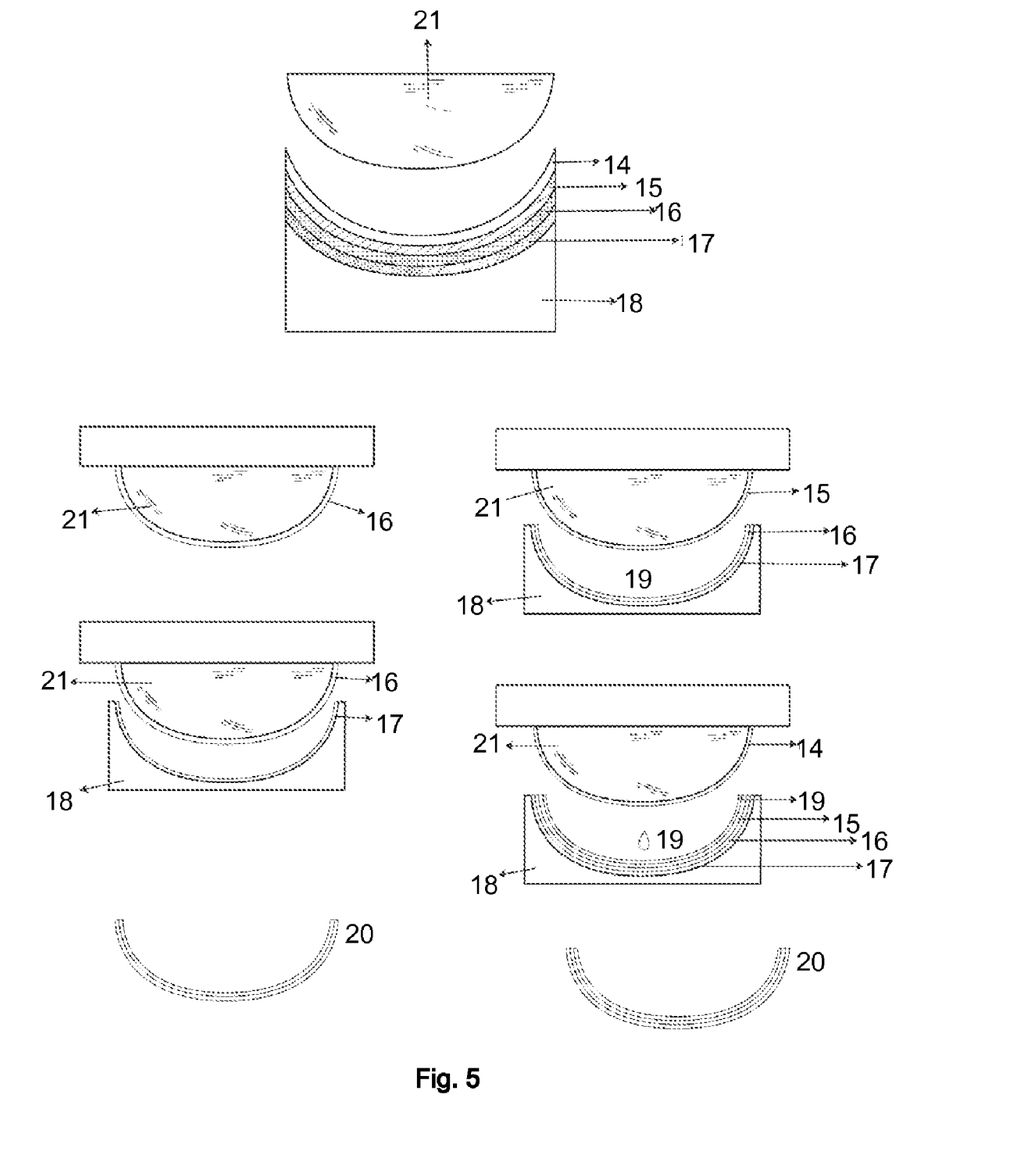
FIG. 5 depicts an embodiment of a 3-D lens.

FIG. 5 depicts one embodiment of the present invention where the lens is comprised on epoxy 17 outer layer, retarder 16, linear or circular polarized lens 15, and the substrate 14. The process is comprised of first the concave mold surface 18 is polished and cleaned. Then, 5 cc of hard epoxy liquid 17 is added onto the concave mold. The concave 18 and convex molds 21 are positioned together such that the outer surface of the retarder film 16 is pressed down onto epoxy liquid 17. The molds are then compressed together. Next, the combined retarder-epoxy composition 20 is subject to UV (ultraviolet light) treatment to cure. Then, linear polarized lens or partially circular polarized lens 15 is placed over the convex mold 21. UV glue 19 is added to the top of the retarder-epoxy composition. The convex mold 21 with the linear polarized or partially circular polarized film 15 is then pressed on top of the UV glue 19. Next UV glue 19 is added to the top of the polarized. lens 15 and lens substrate made of AC, CR, PU, TAC, or glass 14 is added to the convex mold wherein the convex mold 21 is pressed against the concave mold I. When laminating the retarder and linear polarized or partially polarized film, due care is necessary to ensure that the angle is correct at +45 degrees and −45 degrees. A difference within 5 degrees will be acceptable. Then, the direction of polarization is determined and UV treatment is applied. The concave and convex mold for the lens may be made of transparent glass. Approximately 5 cc of hard epoxy is used and spread out to form a layer 0.1-0.5 mm thick. A layer between 0.2-0.3 mm thick is preferred in order to maintain good surface tension. This becomes the layer of hard epoxy in the lens. Epoxy liquid should be heated to 80-90 degrees Celsius so that bubbles are eliminated and liquid or semi-liquid form is maintained. The liquid epoxy is soft enough to flow but is not so viscous that it will flow away without adhering. The liquid epoxy can then be dripped onto retarder film. It will smoothly expand from the center in a circular motion to evenly spread the epoxy and eliminate bubbles. This process may be performed at room temperature. In one embodiment, the holding frame holds the retarder film in contact with the convex mold 21, the convex mold 21 plus retarder film combination is inverted and placed on top of the concave mold 18 and attached together. No gasket is needed because the final hard layer of epoxy is less than 0.5 mm thick. During UV treatment, the liquid epoxy is cured and made hard using ultraviolet light, heat, radiation, pressure, and time or other methods to treat epoxy.

Figure 6:
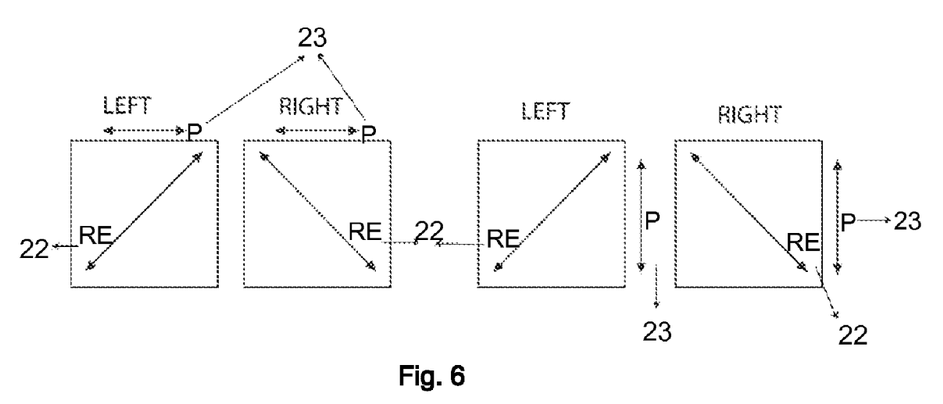
FIG. 6 depicts the most common use of the lens with angle alignment of retarder and polarized layer.

FIG. 6 depicts the method wherein the retarder 22 and the linear polarized or partially polarized layer 23 are aligned at a correct angle of +45 degrees and −45 degrees during lamination.

Figure 7:
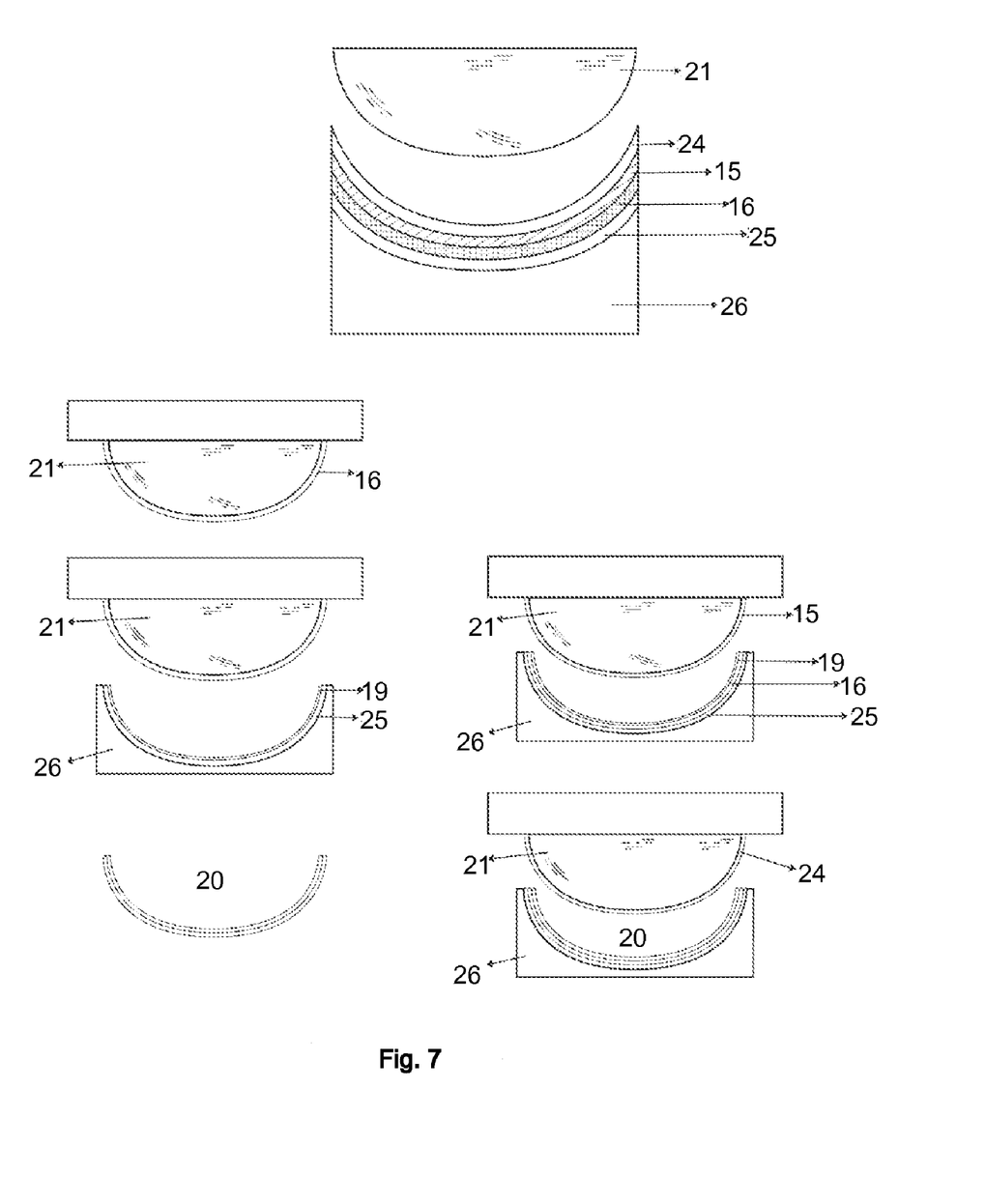
FIG. 7 depicts an embodiment of a multi-layered 3-D lens.

FIG. 7 depicts one embodiment of one 3-D lens made of multiple layers with different materials and details of a second method of production. The lens is comprised of glass substrate 25, retarder 16, polarized lens 15 and lens substrate 24. Glass substrate 25 with lens support base 26 is applied with UV glue 19. Retarder film 16 is layered over the convex mold 21. The lens support base 26 and convex 21 molds are positioned together such that the outer surface of the retarder film 16 is pressed down onto the glass, and then the molds are compressed together. The film is dried with air or UV light treatment. Next a complete linear polarized or partially circular polarized film 15 is added to the convex mold 21, UV glue 19 is added to the retarder 16, and the molds are compressed together. When laminating the retarder 16 and linear polarized or partially polarized film 15, due care must be taken to ensure that the correct angle of +45 and −45 degrees is maintained. However, this is not limited to another combination of any desired degree. Next, the direction of the polarization is determined, the film is dried with air or UV light. Then lens substrate composed of AC, CR, PU, TAC, or glass 24 is added to the polarized lens 15 with UV glue 19. The final combination is sent to an assembly line with UV treatment equipment to be hardened for about three minutes. Fine shaping may be performed manually by cutting away excess film. This produces a retarder film with a hard glass layer on the outer convex surface. In another embodiment, this produces a polarized wafer coated with glass on both sides. The uncoated concave side, the glass-lined side convex side, or both sides could then be combined with a base material, through casting in a gasket mold, injection molding, or other methods for combining lens components.

Figure 8:
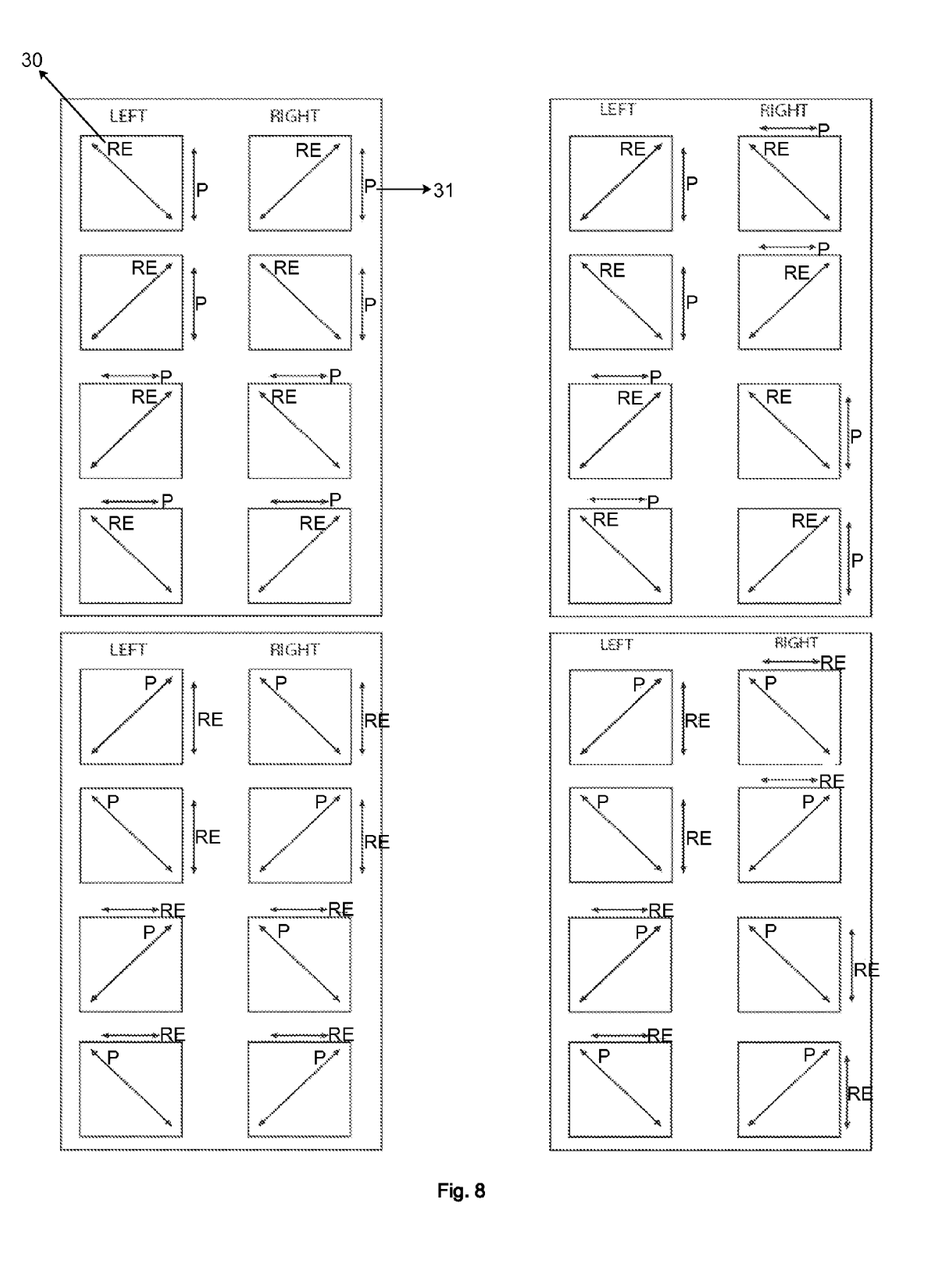
FIG. 8 depicts lens inserts.

FIG. 8 depicts combinations of lens inserts to the right side and left sides depending on the TV and direction of projection. Each box depicts combinations for the lens insert, wherein the retarder angle (RE) 30 and polarized layer angle (P) 31 are aligned depending on such direction. Although the present invention has been described by way of example with reference to the drawings, it is noted that various changes and modifications, including performing steps in different orders, will be apparent to those skilled in the art. Therefore, unless such changes and modifications depart from the scope of the present invention, they should be construed as being included therein. Retarder material may be composed from PVA. Retarder material may be formed onto a flat shaped surface, a sphere, an aspheric surface, a progressive surface, a curved surface, a cylindrical configuration, an irregular shape, a bifocal or multi-focal surface, or with partially-circular polarized film. The substrate may be glass, acrylic, polyurethane, triacetate, casting resin, cellulose acetate, cellulose proprionate, or nylon. The substrate may have one or two sides coated.

What is claimed is:

1. A method of marking a 3-D stereoscopic viewing lens comprising:
   providing a retarder film comprising a PVA film wherein a gap filling agent is added to said PVA film to create a refringent effect wherein said gaping agent is added to said PVA film as said PVA film is being stretched along its x-axis wherein said PVA film is further stretched along its y-axis after said PVA film was stretched along its x-axis, providing a polarized film and providing base material.

2. A method of making a lens according to claim 1, wherein said gap filling agent is selected from the group consisting of potassium iodide, sodium iodide, copper (I) iodide, boric acid, and sodium tetraborate decahedra.

3. A method of making a lens according to claim 1, wherein said polarized film is selected from the group consisting of linear polarized film and circular polarized film.

4. A method of making a lens according to claim 1 wherein said gaping agent is added to said PVA film as said PVA film is being stretched continuously along its x-axis in a moisturized state.

\* \* \* \* \*